No. 841,798. PATENTED JAN. 22, 1907.
J. E. MacMURRAY.
ART OF MANUFACTURING DOUBLE HOOK SHEET METAL BED FASTENERS.
APPLICATION FILED MAR. 22, 1905.
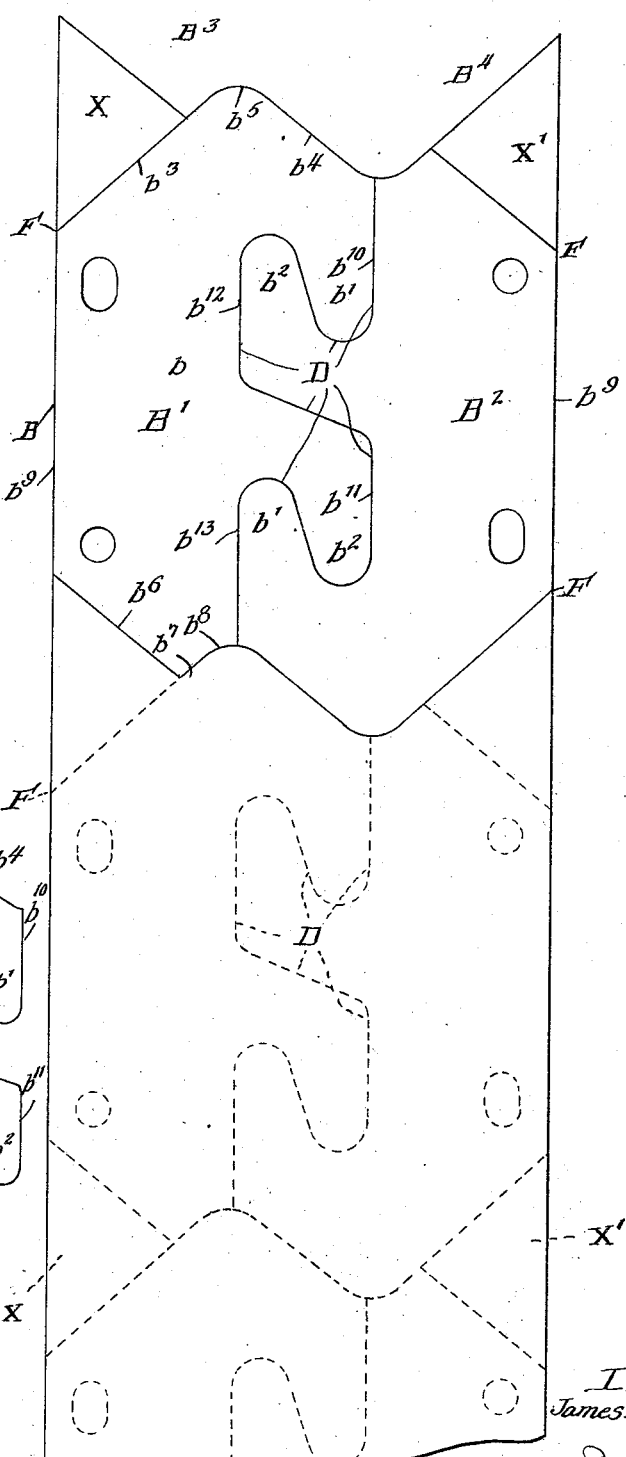

UNITED STATES PATENT OFFICE.

JAMES E. MacMURRAY, OF CHICAGO, ILLINOIS, ASSIGNOR TO ACME FLEXIBLE CLASP COMPANY, OF CHICAGO, ILLINOIS, A CORPORATION OF ILLINOIS.

ART OF MANUFACTURING DOUBLE-HOOK SHEET-METAL BED-FASTENERS.

No. 841,798. Specification of Letters Patent. Patented Jan. 22, 1907.

Application filed March 22 1905. Serial No. 251,428.

*To all whom it may concern:*

Be it known that I, JAMES E. MACMURRAY, a citizen of the United States, residing in Chicago, in the county of Cook and State of Illinois, have invented a new and useful Improvement in the Art of Manufacturing Double-Hook Sheet-Metal Bed-Fasteners, of which the following is a specification.

My invention relates to improvements in the method or process of manufacturing double-hook sheet-metal bed-fasteners which are used for connecting the side rails to the posts of wooden beds or bed-frames.

Heretofore in the manufacture of double-hook sheet-metal bed-fasteners it has been customary to stamp the same out of a strip or plate of sheet-steel or other metal equaling in width the width of one of the double-hook fasteners at its widest part, thus producing a large amount of scrap or waste by the sheet metal cut out between the hooks and also at the inclined ends of each hook.

The object of my invention is to provide a method or process by means of which the amount of scrap or waste produced in the manufacture of double-hook sheet-metal bed-fasteners may be very greatly reduced and the cost of the bed-fasteners correspondingly diminished.

My invention consists in the means I employ to practically accomplish this object or result—that is to say, it consists in forming the double-hook bed-fasteners from a strip or plate of sheet metal equaling in width the body and hook of one of the fasteners and the body of an adjacent fastener by cutting or severing the two apart on what, for convenience, I term a "quadruple-hook line," so that the four hooks for the two fasteners will be simultaneously formed, and the waste or scrap heretofore cut out in forming the hooks of one fastener may thus be utilized and form the hooks of the adjacent fastener.

As these double-hook sheet or plate metal bed-fasteners are customarily in width about two and one-half inches and in length about four inches, it has heretofore required about ten square inches of the strip to form one of the single double-hook bed-fasteners, the same being heretofore always cut from a strip or plate of metal two and one-half inches in width.

By my improved method I take a strip or plate of metal four inches in width, and by severing the same on a quadruple-hook line by suitable dies I am able to form two of the bed-fasteners out of a strip of this width, thus saving fully twenty per cent. of the sheet metal heretofore required in the manufacture of these double-hook bed-fasteners.

In my invention the curved or inclined ends of the fasteners are formed by cutting or severing the four-inch-wide plate or strip on a transversely-extending curved or broken line corresponding to the end outline of the fasteners.

In the accompanying drawings, forming a part of this specification, Figure 1 is a perspective view showing one of the double-hook sheet-metal bed-fasteners as produced by my invention; and Fig. 2 illustrates my improved method or process of forming the double-hook bed-fasteners by severing this double or wide metal strip on the quadruple-hook-forming line.

In the drawings, A represents the strip or plate of sheet metal, preferably four inches in width and of any desired length, and from which the double-hook sheet-metal bed-fasteners are formed by my invention.

B represents one of the bed-fasteners as formed, $b$ being the body of the fastener and $b'$ $b^2$ the two hooks formed on one side thereof. In addition to the two hooks $b'$ $b^2$ each fastener B has at one end two inclined edges $b^3$ $b^4$, united at their junction by a convex curve $b^5$, and at the opposite end each fastener has an inclined straight edge $b^6$ and an inclined edge $b^7$, terminating in a concave curve $b^8$. The back edge $b^9$ of each fastener is straight, as are also the front edges $b^{10}$ $b^{11}$ of each of the hooks of the fastener. The inner edges $b^{12}$ $b^{13}$ of each hook-cavity are likewise straight and parallel to the back $b^9$ of the fastener.

In forming the double-hook fasteners B from the wide strip A of plate or sheet metal the same is divided longitudinally on a quadruple-hook line D and transversely on a broken line F by suitable dies, the quadruple-hook line of division D simultaneously forming the two hooks $b'$ $b^2$ of two laterally-adjacent fasteners B' B², while the transverse division formed by the broken line F forms the inclined end edges of the four longitudinally-adjacent fasteners B' B² B³ B⁴.

The laterally-adjacent fasteners B' B² are reversely turned—that is to say, the hooks $b'$ $b^2$ of the fastener B' project downward, as represented in Fig. 2, while the hooks $b'$ $b^2$ of the other laterally-adjacent fasteners B² project upward, as will be readily understood from Fig. 2 of the drawings.

By this method the scrap or waste heretofore cut out in forming the hooks is utilized in forming the two hooks of a laterally-adjacent fastener, and also much of the scrap heretofore wasted between longitudinally-adjacent fasteners is also utilized, as it will be seen that by my improved method of forming these fasteners the only pieces of scrap produced are the small triangular pieces X X', which are cut out to form the inclined edges $b^3$ $b^6$ of the two pair of longitudinally-adjacent fasteners.

I claim—

The improved method of forming a series of multiple-hook bed-fasteners from plate metal, which consists in severing a strip or sheet of such metal which is greater in width than one but less than two fasteners into two equal parts by a continuous line having a general longitudinal direction, the said line being curved to form four interlocking hooks $b^2, b', b', b^2$, wholly within the interior of such blank, the hooks of the fastener at the right hand lying within and at the left of the hooks of the fastener at the left hand; and also severing the metal on transverse lines so arranged that the top end and the bottom end of one pair of fasteners, so longitudinally separated, are severed from the bottom end and from the top end respectively of the next pair of fasteners, substantially as set forth.

JAMES E. MacMURRAY.

Witnesses:
H. M. MUNDAY,
D. C. BROWN.